United States Patent
Medles et al.

(10) Patent No.: US 10,485,001 B2
(45) Date of Patent: Nov. 19, 2019

(54) FREQUENCY HOPPING DESIGN FOR GRANT-FREE TRANSMISSION IN MOBILE COMMUNICATIONS

(71) Applicant: MediaTek Singapore Pte. Ltd., Singapore (SG)

(72) Inventors: Abdelkader Medles, Cambridge (GB); Jiann-Ching Guey, Hsinchu (TW); Arnaud Abel Francois Cupillard, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/104,104

(22) Filed: Aug. 16, 2018

(65) Prior Publication Data
US 2019/0059081 A1    Feb. 21, 2019

Related U.S. Application Data

(60) Provisional application No. 62/546,621, filed on Aug. 17, 2017.

(51) Int. Cl.
*H04B 1/7143* (2011.01)
*H04W 72/04* (2009.01)
*H04B 1/7156* (2011.01)

(52) U.S. Cl.
CPC ........ *H04W 72/048* (2013.01); *H04B 1/7143* (2013.01); *H04B 1/7156* (2013.01); *H04W 72/0453* (2013.01); *H04B 2001/71563* (2013.01); *H04B 2201/696* (2013.01); *H04B 2201/71323* (2013.01)

(58) Field of Classification Search
CPC ...... H04L 5/0012; H04B 1/713; H04B 1/7143
USPC .......................................... 375/132, 133, 136
See application file for complete search history.

(56) References Cited

U.S. PATENT DOCUMENTS

| | | | |
|---|---|---|---|
| 2010/0189032 A1 | 7/2010 | Chen et al. | |
| 2016/0295345 A1* | 10/2016 | Oh | H04W 4/70 |
| 2017/0303275 A1* | 10/2017 | Banerjea | H04B 1/713 |
| 2018/0249448 A1* | 8/2018 | Yasukawa | H04W 28/06 |

OTHER PUBLICATIONS

Taiwan Intellectual Property Office, Office Action for Taiwan Patent Application No. 107128761, dated Jun. 5, 2019.
Intel Corporation, Uplink grant free transmission for URLLC services, 3GPP TSG RAN1 WG Meeting #88, Athens, Greece, Feb. 13-17, 2017.

* cited by examiner

*Primary Examiner* — Kevin Kim
(74) *Attorney, Agent, or Firm* — Han IP PLLC; Andy M. Han (57) ABSTRACT

Various solutions for frequency hopping design for grant-free transmission with respect to user equipment and network apparatus in mobile communications are described. An apparatus may receive a frequency hopping pattern from a network node. The apparatus may determine a frequency hopping location according to the frequency hopping pattern. The apparatus may perform an uplink grant-free transmission according to the frequency hopping position. The frequency hopping pattern may comprise user equipment specific information.

12 Claims, 5 Drawing Sheets

FREQUENCY HOPPING DESIGN FOR GRANT-FREE TRANSMISSION IN MOBILE COMMUNICATIONS

CROSS REFERENCE TO RELATED PATENT APPLICATION(S)

The present disclosure is part of a non-provisional application claiming the priority benefit of U.S. Patent Application No. 62/546,621, filed on 17 Aug. 2017, the content of which is incorporated by reference in its entirety.

TECHNICAL FIELD

The present disclosure is generally related to mobile communications and, more particularly, to frequency hopping design for grant-free transmission with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement for one transmission of a packet is $1-10^{-5}$ for 32 bytes with a user plane latency of 1 ms. For URLLC, the target for user plane latency should be 0.5 ms for uplink and 0.5 ms for downlink.

The uplink grant-free transmission or the semi-persistent scheduling (SPS) transmission can be used to reduce the latency of URLLC services. The user equipment (UE) may be configured to transmit its uplink data on the configured grant without transmitting a prior request to improve the transmission latency. The network may pre-configure specific radio resources (e.g., time and frequency resources) for the UE to perform the SPS/grant-free transmissions.

In order to increase the reliability or the robustness for the URLLC transmissions, the UE may be configured to transmit repetitions for uplink information. For example, uplink grant-free transmissions may be configured with repetitions. Since the network node may allow several UEs to share the same resources on the grant-free basis, collisions between grant-free uplink UEs may happen if the resources are not enough.

Accordingly, the uplink grant-free transmission may be combined with frequency hopping schemes in order to exploit frequency diversity and reduce the impact of collisions. Therefore, it is needed to provide proper frequency hopping design for the uplink grant-free transmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to frequency hopping design for grant-free transmission with respect to user equipment and network apparatus in mobile communications.

In one aspect, a method may involve an apparatus receiving a frequency hopping pattern from a network node. The method may also involve the apparatus determining a frequency hopping location according to the frequency hopping pattern. The method may further involve the apparatus performing an uplink grant-free transmission according to the frequency hopping position. The frequency hopping pattern may comprise UE specific information.

In one aspect, an apparatus may comprise a transceiver capable of wirelessly communicating with a plurality of nodes of a wireless network. The apparatus may also comprise a processor communicatively coupled to the transceiver. The processor may be capable of receiving a frequency hopping pattern from a network node. The processor may also be capable of determining a frequency hopping location according to the frequency hopping pattern. The processor may further be capable of performing an uplink grant-free transmission according to the frequency hopping position. The frequency hopping pattern may comprise UE specific information.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to frequency hopping design for grant-free transmission with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, the network node may configure two types of uplink grants for the UE to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., service request (SR), random-access channel (RACH) request or buffer status report (BSR)) to the network. After receiving the request, the network may configure the dynamic grant according to UE's request for the UE to perform uplink data transmission.

The other type of the uplink grant may comprise the configured grant. The configured grant may be configured by the network without UE's request. For example, the uplink grant-free transmission or the SPS transmission is used to reduce the latency of URLLC services. The UE may be configured to transmit its uplink data on the configured grant without transmitting a prior request to improve the transmission latency. The network may pre-configure specific radio resources (e.g., time and frequency resources) for the UE to perform the SPS/grant-free transmissions.

In order to increase the reliability or the robustness for the URLLC transmissions, the UE may be configured to transmit repetitions for uplink information. For example, uplink grant-free transmissions may be configured with repetitions in NR. Since the network node may allow several UEs to share the same resources on the grant-free basis, collisions between grant-free uplink UEs may happen if the resources are not enough. For example, assuming that $N_{sb}$ sub-bands are used, and K UEs can transmit at the same time, in a case that $K > N_{sb}$, the grant-free transmissions from certain UEs may collide due to limited resources. Accordingly, the uplink grant-free transmission may be combined with frequency hopping schemes in order to exploit frequency diversity and reduce the impact of collisions.

Figure 1:
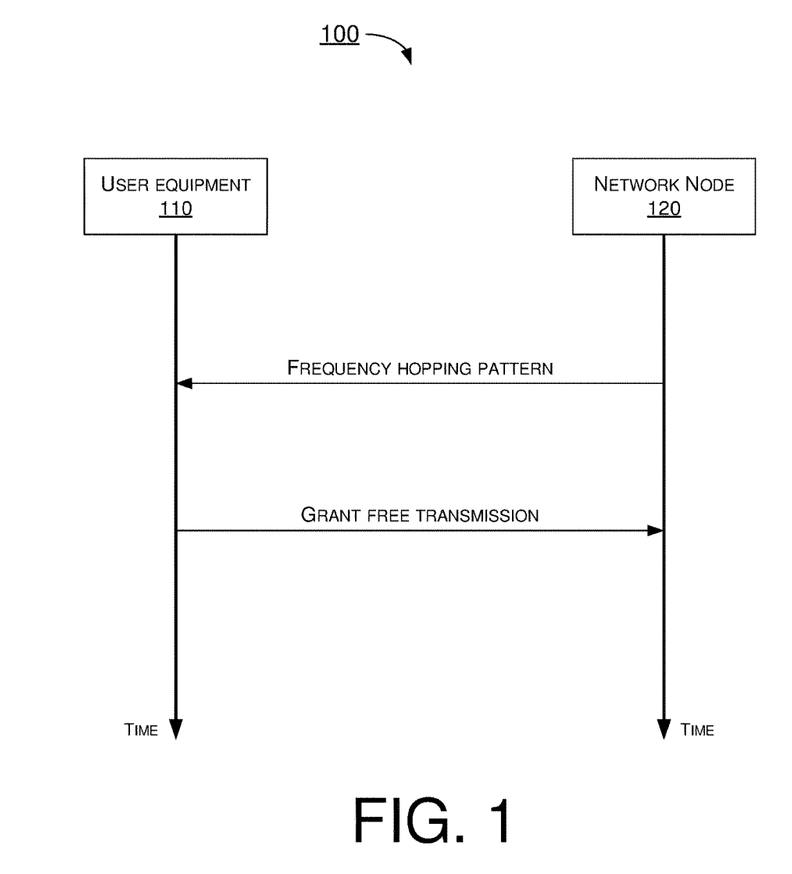
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE 110 and a network node 120, which may be a part of a wireless communication network (e.g., an LTE network, an LTE-Advanced network, an LTE-Advanced Pro network, a 5G network, an NR network, an IoT network or an NB-IoT network). Network node 120 may be configured to transmit or broadcast a frequency hopping pattern to a UE or a group of UEs. UE 110 may be configured to receive the frequency hopping pattern from network node 120. UE 110 may be configured to determine a frequency hopping location according to the frequency hopping pattern. The frequency hopping location may comprise time-frequency resources. UE 110 may further be configured to perform uplink grant-free transmissions according to the frequency hopping position. Specifically, UE 110 may transmit uplink information on the frequency hopping position for performing the uplink grant-free transmissions.

The frequency hopping pattern may comprise a random frequency hopping pattern. The random frequency hopping pattern may be used to randomize the collision from different UEs and reduce the impact of collisions. For example, the random frequency hopping pattern may be configured per UE. Each UE may receive a different random frequency hopping pattern. Alternatively, the random frequency hopping pattern may also be configured for a group of UEs. The group of UEs may share the same random frequency hopping pattern.

Specifically, the random frequency hopping pattern may comprise a random sequence with different initialization per UE or group of UEs. The random frequency hopping pattern may further comprise UE specific information such as, for example and without limitation, a UE identity (ID) $N_{ID}^{UE}$ or a group UE ID $N_{ID}^{Group\ UEs}$. The UEs within the same group sharing the same hopping pattern may further use a different virtual resource block shift $VRB_{shift}$ to make the allocations among the same group orthogonal or reduce the impact of collisions. The virtual resource block shift $VRB_{shift}$ may be a multiple of the sub-band size. The random frequency hopping pattern may comprise the following equations.

$$\tilde{n}_{PRB}(n_s) = (VRB_{shift} + f_{hop}(i) \cdot N_{RB}^{sb}) \bmod (N_{RB}^{sb} \cdot N_{sb})$$

$$f_{hop}(i) = \begin{cases} 0 & N_{sb} = 1 \\ \left( f_{hop}(i-1) + \sum_{k=i\cdot 10+1}^{i\cdot 10+9} c(k) \times 2^{k-(i\cdot 10+1)} \right) \bmod N_{sb} & N_{sb} = 2 \\ \left( f_{hop}(i-1) + \left( \sum_{k=i\cdot 10+1}^{i\cdot 10+9} c(k) \times 2^{k-(i\cdot 10+1)} \right) \bmod (N_{sb}-1) + 1 \right) \bmod N_{sb} & N_{sb} > 2 \end{cases}$$

$$c_{init} = 2^9 \cdot (n_f \bmod 4) + N_{ID}^{Group\ UEs}$$

$N_{sb}$ denotes the number of sub-band. $N_{RB}^{sb}$ denotes the size of sub-band. i denotes slot index or mini-slot index. $\tilde{n}_{PRB}$ denotes the corresponding physical resource block (PRB) used. $c_{init}$ may comprise the UE specific information (e.g., UE ID or group UE ID).

Figure 2:
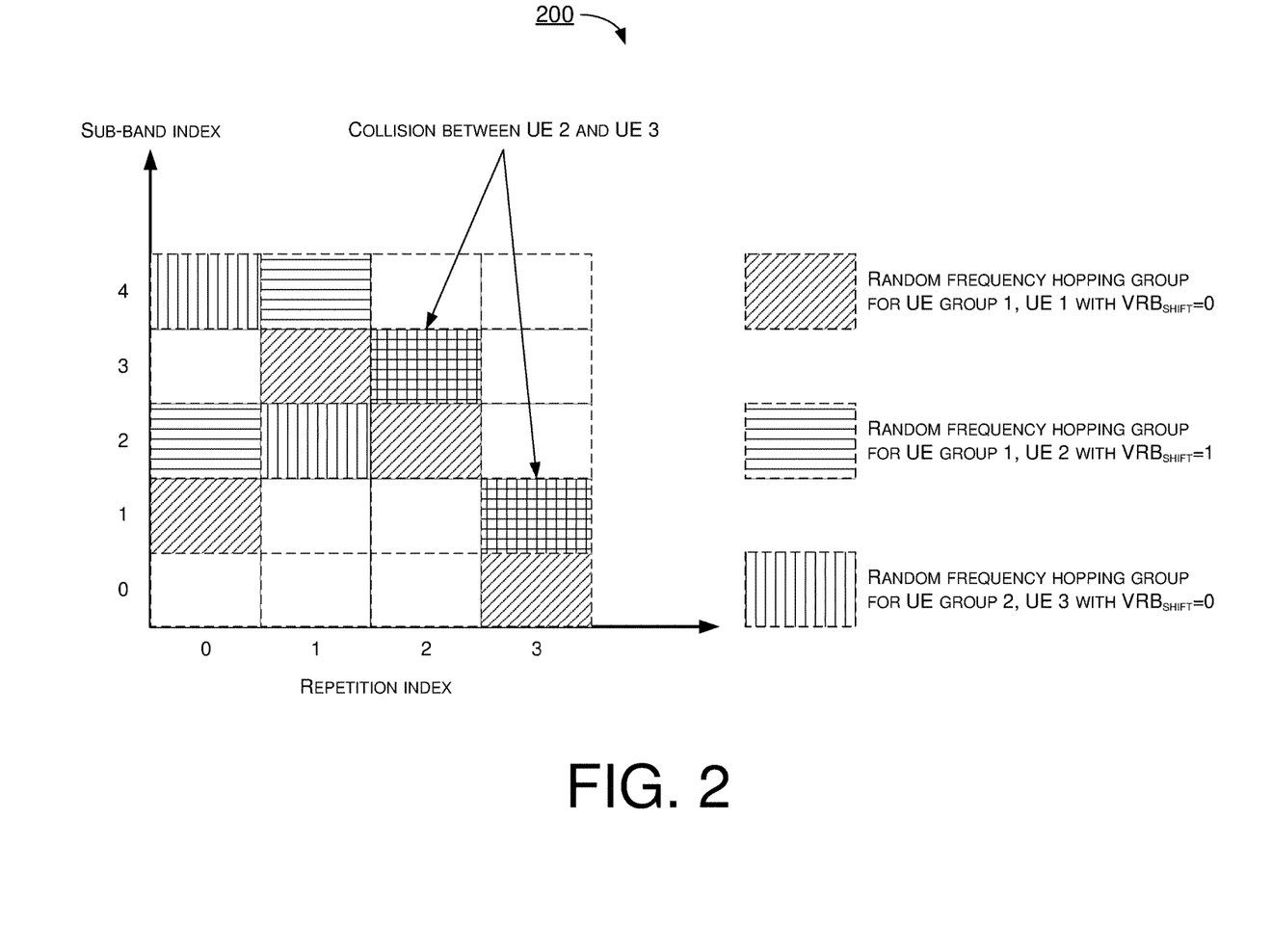
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a plurality of UEs (e.g., UE 1, UE 2 and UE 3) and a network node, which may be a part of a wireless communication network (e.g., an LTE network, an LTE-Advanced network, an LTE-Advanced Pro network, a 5G network, an NR network, an IoT network or an NB-IoT network). FIG. 2 illustrates the random frequency hopping pattern with 2 UE groups for 5 sub-bands (e.g., $N_{sb}=5$) and 4 UEs (e.g., K=4). The UE group 1 may comprise UE 1 with $VRB_{shift}=0$ and UE 2 with $VRB_{shift}=1$. The UE group 2 may comprise UE 3 with $VRB_{shift}=0$. Each UE may be able to determine the frequency hopping locations according to the random frequency hopping pattern. Since the random frequency hopping pattern comprises UE specific information (e.g., UE ID) for each UE, each UE may derive a different frequency hopping pattern. The frequency hopping patterns from a plurality of UEs may be randomized. The main drawback of the random frequency hopping pattern is that it is not optimized to reduce the amount of collisions. As shown in FIG. 2, the collision may happen between UE 2 and UE 3 in repetition index 2 and 3.

In some implementations, the frequency hopping pattern may comprise an orthogonal frequency hopping pattern or a quasi-orthogonal frequency hopping pattern. The orthogonal/quasi-orthogonal frequency hopping pattern may be signaled to each UE. After receiving the orthogonal/quasi-orthogonal frequency hopping pattern, the UE may be configured to determine a frequency hopping location according to the orthogonal/quasi-orthogonal frequency hopping pattern. The frequency hopping patterns derived by the UEs may be orthogonal or quasi-orthogonal with each other. The orthogonal/quasi-orthogonal frequency hopping pattern may comprise the UE specific information. The orthogonal/quasi-orthogonal frequency hopping pattern may comprise the following equations.

$$\tilde{n}_{PRB}(n_s)(f_{hop}^{UE}(i \bmod K) \cdot N_{RB}^{sb}) \bmod (N_{RB}^{sb} \cdot N_{sb})$$

$$f_{hop}^{UE}(k) = p_k^{UE} \; k=0, 1, \ldots, K-1 \text{ and } 0 \leq p_k \leq N_{sb}-1$$

The frequency hopping pattern $f_{hop}^{UE}(k)$ may be signaled to each UE. $N_{sb}$ denotes the number of sub-band. $N_{RB}^{sb}$ denotes the size of sub-band. i denotes slot index or mini-slot index. $\tilde{n}_{PRB}$ denotes the corresponding PRB used. The UE allocation in frequency domain could be the same size as the sub-band but could be as well smaller or larger than the sub-band. The orthogonal/quasi-orthogonal frequency hopping pattern may be used to reduce the amount of collisions and increase the multiplexing capacity.

In some implementations, the frequency hopping pattern may comprise a fixed frequency hopping pattern or a common basic pattern. The common basic pattern may be broadcasted to a plurality of UEs with a UE specific frequency shift $F_0$ and/or a UE specific time shift $T_0$. Specifically, the common basic pattern may be shared by a plurality of UEs. For each UE, the COMMON BASIC PATTERN MAY FURTHER COMPRISE A UE SPECIFIC FREQUENCY SHIFT $F_0^{UE}$ and/or a UE specific time shift $T_0^{UE}$. The common basic pattern may comprise the following equations.

$$\tilde{n}_{PRB} = (F_0^{UE} + f_{hop}((i-T_0^{UE}) \bmod K) \cdot N_{RB}^{sb}) \bmod (N_{RB}^{sb} \cdot N_{sb})$$

$$f_{hop}(k) = p_k \; k=0, 1, \ldots, K-1 \text{ and } 0 \leq p_k \leq N_{sb}-1$$

The common basic pattern $f_{hop}(k)$ may be broadcasted to all UEs. $N_{sb}$ denotes the number of sub-band. $N_{RB}^{sb}$ denotes the size of sub-band. i denotes slot index or mini-slot index. $\tilde{n}_{PRB}$ denotes the corresponding PRB used. The UE allocation in frequency domain could be the same size as the sub-band but could be as well smaller or larger than the sub-band. The common basic pattern may be used to reduce the amount of collisions and increase the multiplexing capacity.

Figure 3:
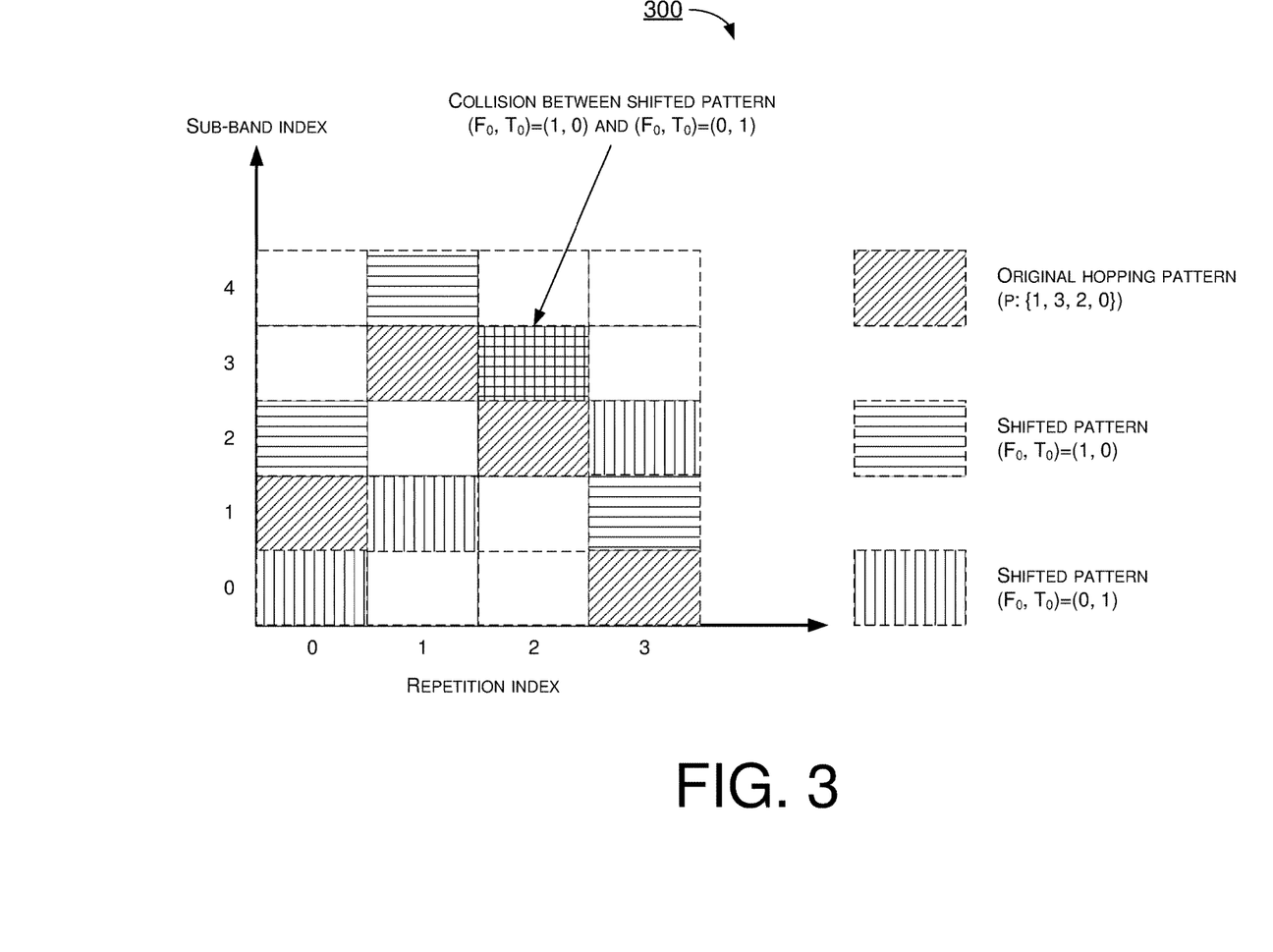
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a plurality of UEs (e.g., UE 1, UE 2 and UE 3) and a network node, which may be a part of a wireless communication network (e.g., an LTE network, an LTE-Advanced network, an LTE-Advanced Pro network, a 5G network, an NR network, an IoT network or an NB-IoT network). FIG. 3 illustrates the frequency hopping pattern based on a common basic hopping sequence $\{f_{hop}(0)=1, f_{hop}(1)=3, f_{hop}(2)=2, f_{hop}(3)=0\}$ for 5 sub-bands (e.g., $N_{sb}=5$) and 4 UEs (e.g., K=4). The frequency shift and time shift of UE 1 may be $(F_0, T_0)=(0, 0)$. The frequency shift and time shift of UE 2 may be $(F_0, T_0)=(1, 0)$. The frequency shift and time shift of UE 3 may be $(F_0, T_0)=(0, 1)$. The illustrated frequency hopping pattern may be able to support as much as $N_{sb} \times K = 5 \times 4 = 20$ users multiplexed one the same resources with a maximum 1 collision only between 2 UEs. The advantages of such frequency hopping scheme may comprise exploiting frequency diversity, reducing the impact of potential collisions, or increasing the multiplexing capacity of the grant-free UEs.

In some implementations, the UE may be configured to indicate the repetition index to the network node when performing the uplink grant-free transmissions according to the frequency hopping pattern. The network node may be configured to decode the received information according to the repetitions.

Illustrative Implementations

Figure 4:
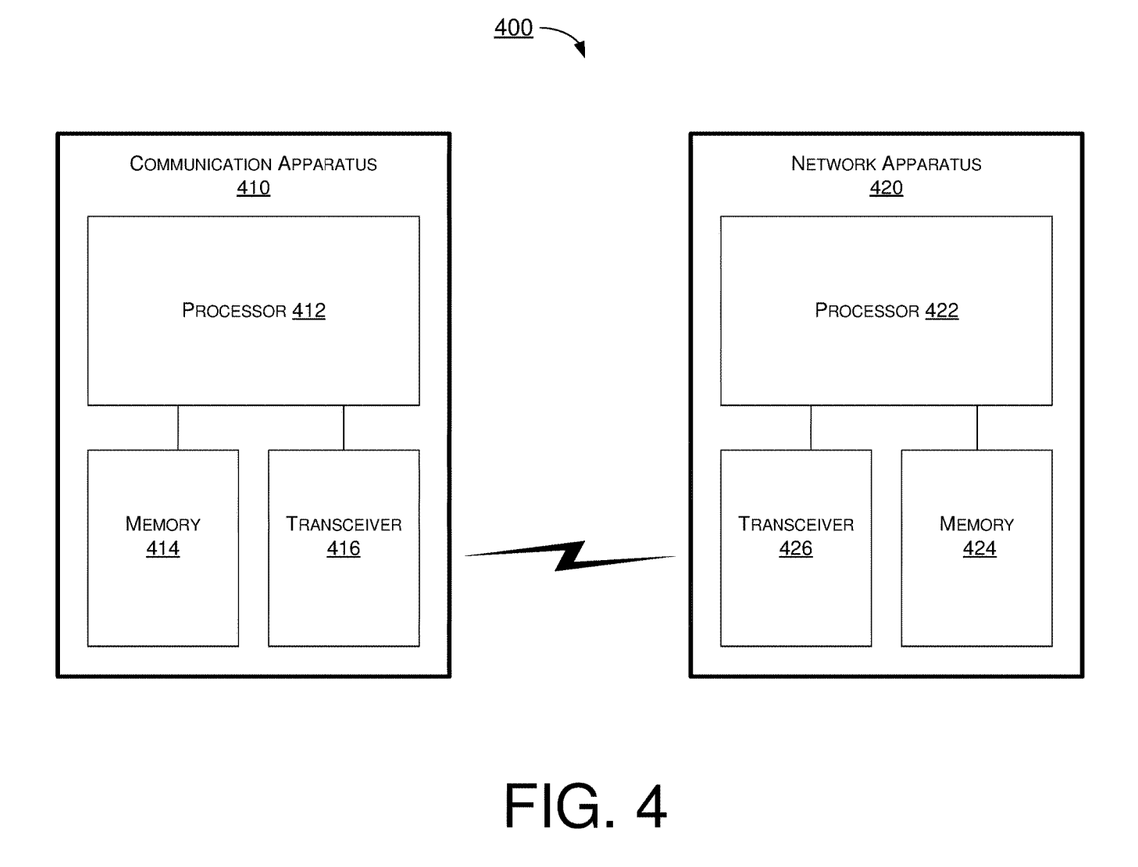
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to frequency hopping design for grant-free transmission with respect to user equipment and network apparatus in wireless communications, including scenarios 100, 200 and 300 described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, network apparatus 420 may be configured to transmit or broadcast a frequency hopping pattern to a communication apparatus or a group of communication apparatus. Processor 412 may be configured to receive, via transceiver 416, the frequency hopping pattern from network apparatus 420. Processor 412 may be configured to determine a frequency hopping location according to the frequency hopping pattern. The frequency hopping location may comprise time-frequency resources. Processor 412 may further be configured to perform uplink grant-free transmissions according to the frequency hopping position. Specifically, processor 412 may transmit, via transceiver 416, uplink information on the frequency hopping position for performing the uplink grant-free transmissions.

In some implementations, processor 412 may receive, via transceiver 416, a random frequency hopping pattern from network apparatus 420. Network apparatus 420 may use the random frequency hopping pattern to randomize the collision from different communication apparatus and reduce the impact of collisions. For example, network apparatus 420 may configure the random frequency hopping pattern per communication apparatus. Each communication apparatus may receive a different random frequency hopping pattern. Alternatively, network apparatus 420 may also configure the random frequency hopping pattern to a group of communication apparatus. The group of communication apparatus may share the same random frequency hopping pattern.

In some implementations, processor 412 may receive, via transceiver 416, a random sequence with different initialization per communication apparatus or group of communication apparatus. The random frequency hopping pattern may further comprise UE specific information such as, for example and without limitation, a UE ID or a group UE ID. The communication apparatus within the same group sharing the same hopping pattern may further use a different virtual resource block shift to make the allocations among the same group orthogonal or reduce the impact of collisions. The virtual resource block shift may be a multiple of the sub-band size.

In some implementations, processor 412 may receive, via transceiver 416, an orthogonal frequency hopping pattern or a quasi-orthogonal frequency hopping pattern. The orthogonal/quasi-orthogonal frequency hopping pattern may be signaled to each communication apparatus. After receiving the orthogonal/quasi-orthogonal frequency hopping pattern, processor 412 may be configured to determine a frequency hopping location according to the orthogonal/quasi-orthogonal frequency hopping pattern. The frequency hopping patterns derived by different communication apparatus may be orthogonal or quasi-orthogonal with each other. The orthogonal/quasi-orthogonal frequency hopping pattern may comprise the UE specific information. Network apparatus 420 may use the orthogonal/quasi-orthogonal frequency hopping pattern to reduce the amount of collisions and increase the multiplexing capacity.

In some implementations, processor 412 may receive, via transceiver 416, a fixed frequency hopping pattern or a common basic pattern. Network apparatus 420 may broadcast the common basic pattern to a plurality of communication apparatus with a UE specific frequency shift and/or a UE specific time shift. Specifically, the common basic pattern may be shared by a plurality of communication apparatus. For each communication apparatus, the common basic pattern may further comprise a UE specific frequency shift and/or a UE specific time shift. Network apparatus 420 may broadcast the common basic pattern to all communication apparatus. Network apparatus 420 may use the common basic pattern to reduce the amount of collisions and increase the multiplexing capacity.

In some implementations, processor 412 may be configured to indicate the repetition index to network apparatus 420 when performing the uplink grant-free transmissions according to the frequency hopping pattern. Network apparatus 420 may be configured to decode the received information according to the repetitions.

Illustrative Processes

Figure 5:
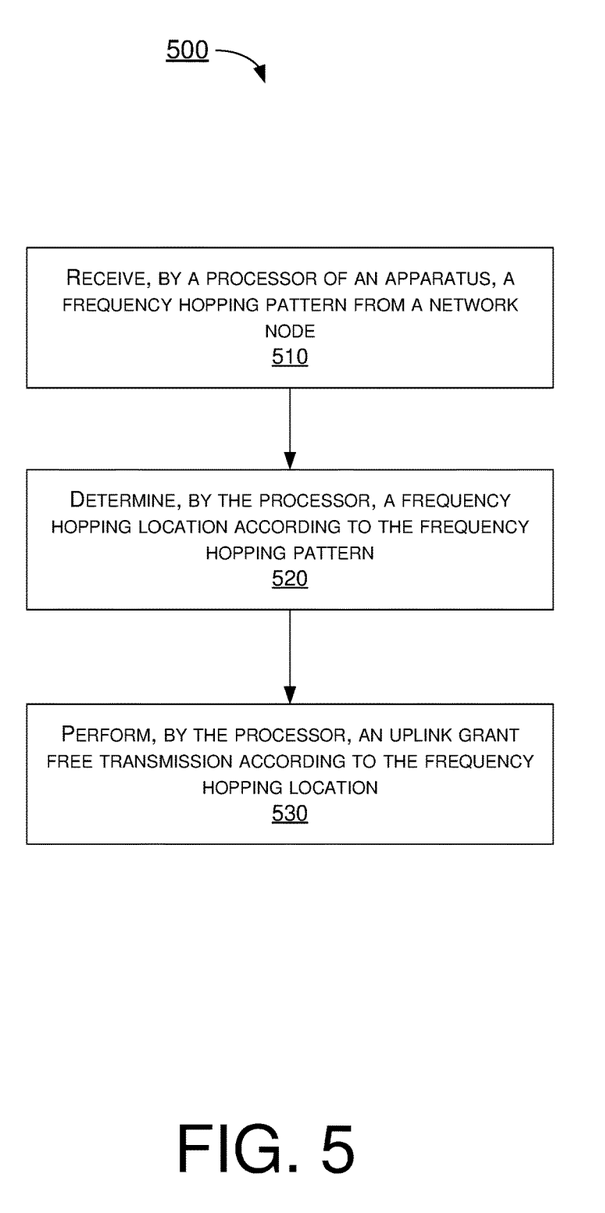
FIG. 5 is a flowchart of an example process in accordance with an implementation of the present disclosure.

FIG. 5 illustrates an example process 500 in accordance with an implementation of the present disclosure. Process 500 may be an example implementation of scenarios 100, 200 and 300, whether partially or completely, with respect to frequency hopping design for grant-free transmission in accordance with the present disclosure. Process 500 may represent an aspect of implementation of features of communication apparatus 410. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 receiving a frequency hopping pattern from a network node. Process 500 may proceed from 510 to 520.

At 520, process 500 may involve processor 412 determining a frequency hopping location according to the frequency hopping pattern. Process 500 may proceed from 520 to 530.

At 530, process 500 may involve processor 412 performing an uplink grant-free transmission according to the frequency hopping position. The frequency hopping pattern may comprise UE specific information.

In some implementations, the frequency hopping pattern may comprise at least one of a random frequency hopping pattern, a fixed frequency hopping pattern, an orthogonal frequency hopping pattern, or a quasi-orthogonal frequency hopping pattern.

In some implementations, the frequency hopping pattern may be configured for a specific UE or a group of UEs.

In some implementations, the UE specific information may comprise a UE ID or a group UE ID.

In some implementations, the frequency hopping pattern may further comprise a UE specific frequency shift.

In some implementations, the frequency hopping pattern may further comprise a UE specific time shift.

In some implementations, the frequency hopping pattern may further comprise a virtual resource block shift.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of an apparatus, a frequency hopping pattern from a network node;
    determining, by the processor, a frequency hopping location according to the frequency hopping pattern; and
    performing, by the processor, an uplink grant-free transmission according to the frequency hopping position,
    wherein the frequency hopping pattern comprises user equipment (UE) specific information, and
    wherein the UE specific information comprises a UE identity (ID), or a group UE ID.

2. The method of claim 1, wherein the frequency hopping pattern comprises at least one of a random frequency hopping pattern, a fixed frequency hopping pattern, an orthogonal frequency hopping pattern, or a quasi-orthogonal frequency hopping pattern.

3. The method of claim 1, wherein the frequency hopping pattern is configured for a specific UE, or a group of UEs.

4. The method of claim 1, wherein the frequency hopping pattern further comprises a UE specific frequency shift.

5. The method of claim 1, wherein the frequency hopping pattern further comprises a UE specific time shift.

6. The method of claim 1, wherein the frequency hopping pattern further comprises a virtual resource block shift.

7. An apparatus, comprising:
    a transceiver capable of wirelessly communicating with a plurality of nodes of a wireless network; and
    a processor communicatively coupled to the transceiver, the processor capable of:
        receiving, via the transceiver, a frequency hopping pattern from a network node;
        determining a frequency hopping location according to the frequency hopping pattern; and
        performing an uplink grant-free transmission according to the frequency hopping position,
    wherein the frequency hopping pattern comprises user equipment (UE) specific information, and
    wherein the UE specific information comprises a UE identity (ID), or a group UE ID.

8. The apparatus of claim 7, wherein the frequency hopping pattern comprises at least one of a random frequency hopping pattern, a fixed frequency hopping pattern, an orthogonal frequency hopping pattern, or a quasi-orthogonal frequency hopping pattern.

9. The apparatus of claim 7, wherein the frequency hopping pattern is configured for a specific UE, or a group of UEs.

10. The apparatus of claim 7, wherein the frequency hopping pattern further comprises a UE specific frequency shift.

11. The apparatus of claim 7, wherein the frequency hopping pattern further comprises a UE specific time shift.

12. The apparatus of claim 7, wherein the frequency hopping pattern further comprises a virtual resource block shift.

* * * * *